June 30, 1970            L. M. ROSZYK            3,518,524

CORDLESS ELECTRIC APPLIANCE

Filed Jan. 3, 1967

INVENTOR
LEON M. ROSZYK by

George R. Clark
ATTORNEY

United States Patent Office 3,518,524
Patented June 30, 1970

3,518,524
CORDLESS ELECTRIC APPLIANCE
Leon M. Roszyk, Berwyn, Ill., assignor to Sunbeam
Corporation, Chicago, Ill., a corporation of Illinois
Filed Jan. 3, 1967, Ser. No. 606,647
Int. Cl. H02j 7/00
U.S. Cl. 320—2                                           5 Claims

ABSTRACT OF THE DISCLOSURE

Device for quick charging a nickel cadmium battery wherein a temperature sensing means is provided to sense the temperature of the casing of the battery and this temperature sensing means includes a switch connected in series with the circuit comprising the charging source and the battery so that when the temperature reaches a predetermined value the charging of the battery is terminated until the temperature falls below such predetermined valve.

---

This invention relates to a cordless type electric appliance and to a quick-charging circuit therefor, and more particularly to a cordless type electric appliance using nickel cadmium batteries as its source of power and which nickel cadmium batteries are rechargeable.

Nickel cadmium batteries are commonly used in cordless type electric appliances such as electric knives, shavers and the like. Such nickel cadmium batteries are, of course, recharged while the appliance is not in use. It has been the accepted practice to recharge the nickel cadmium cells at one-tenth the capacity of the particular cell. For example, in the so-called "modified C" cell which has a capacity of "C" of 1200 milliampere hours, the charge current recommended is C/10 or 120 milliamperes. The efficiency of the battery requires that this charge be placed on the cell for sixteen hours. The nickel cadmium cell generally may be charged at a faster rate than this, provided the energy supplied to the cell does not exceed the sixteen-hour energy level. Moreover, difficulty has heretofore been experienced in quick-charging nickel cadmium cells in that the temperature would rise excessively, causing breakdown of the cell. Failure of nickel cadmium cells is generally caused by separator problems. The most common failure is breakdown of the separator due to excessive heat and eventual internal short circuits.

There appear to be several response of the cells which can be used as signals to terminate charging. Although voltage in some instances may be the easiest to detect, it is extremely difficult to use in a nickel cadmium cell since the cell voltage during charging exhibits a very flat characteristic until a point at which a fast rise takes place. This rise is not necessarily an indication of full charge. It may occur anywhere in the charge cycle depending on the age and previous history of the cell. Moreover, because the voltage differential between a fully charged nickel cadmium cell, and a partly discharged nickel cadmium cell is very slight, it is difficult and expensive to provide the sophisticated voltage sensing equipment to control the charging rate as a function of the cell voltage.

Pressure within the cell changes during charging due to free oxygen produced in the process, which oxygen is further combined during discharge. This pressure may also be used as an indication of the charge condition of the cell. A third electrode may be provided to absorb the oxygen and use it to change the electrical characteristic of the electrodes to provide a state of charge signal. However, during some conditions of overcharge often unavoidable, free hydrogen is also produced and is not recombined during discharge so that if the pressure alone were monitored, the hydrogen content of the cell could give a false state of charge indication. Other schemes used to monitor the charge condition of a cell have not been entirely satisfactory.

Accordingly, it is an object of the present invention to provide a new and improved cordless type electric appliance.

It is a further object of the present invention to provide a quick rechargeable electric appliance.

Another object of the present invention is to provide a new and improved apparatus for quick charging of nickel cadmium batteries.

In accordance with the present invention it was found that nickel cadmium batteries could be quick-charged provided the cell did not reach an excessive temperature, i.e., above 110° F. The battery capacity was found not to be adversely affected by fast charging. Moreover, it is found that a very steep temperature rise occurs at a quick charge rate after the battery has received a partial charge.

In accordance with the present invention there is provided a quick rechargeable cordless type electric appliance of the type having nickel cadmium batteries connected to drive a load such as the motor of a cordless electric knife or similar device. The temperature of the nickel cadmium battery is continually monitored so that whenever the temperature reaches a selected high temperature, the charging will be discontinued until the battery has cooled sufficiently so that rapid recharging may be reinstated. To this end a thermostat is held tightly against the longitudinal side of one of the cells of a battery pack, and is set to open at approximately 105° F. The thermostat switch is serially connected in circuit with the batteries and the source of charging voltage. Moreover, in a preferred embodiment the thermostat switch does not carry the battery discharge current so as to prevent the thermostat switch from cycling during very heavy loads or other relatively heavy current discharges. It has been found that the battery temperature might reach 130° F. under such conditions of discharge and if the thermostat switch were in series with the load or motor circuit, the motor operation would be interrupted even though the battery had remaining charge.

The quick charging of sealed nickel cadmium cells is of considerable importance in many applications such as with the cordless electric knife to permit rapid charging of the power pack, thereby permitting more frequent use of the electric appliance. The proposed method is simple and can be installed at low cost. Moreover, the battery life is not adversely affected.

For a better understanding of the present invention, reference may be had to the accompanying drawings wherein.

Figure 1:
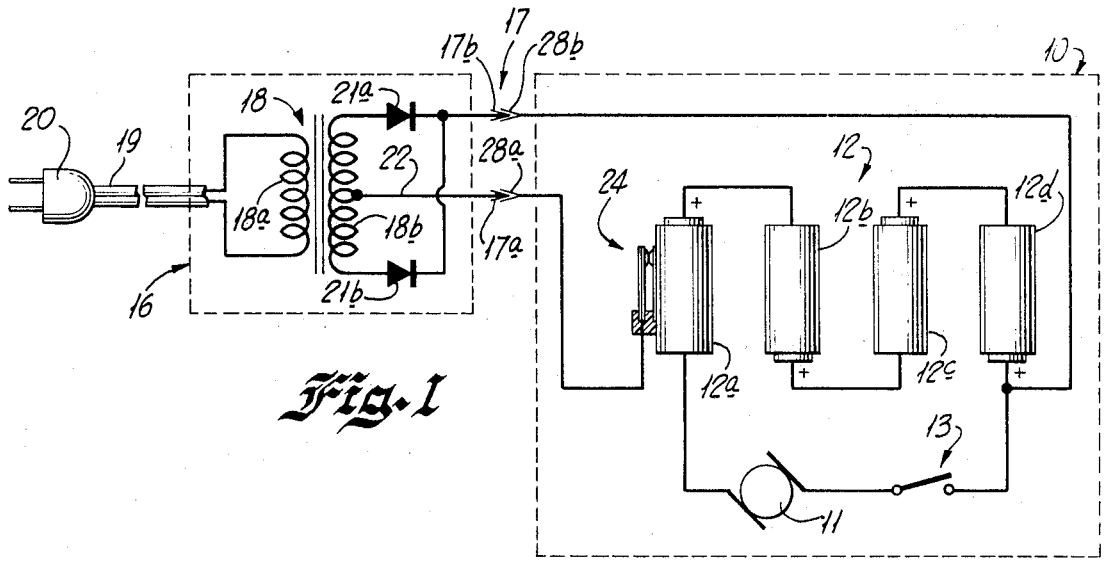
FIG. 1 is a schematic diagram of an electric appliance circuit employing the quick rechargeable system of the present invention.

Referring now to the drawings, there is schematically illustrated a cordless type electric appliance 10 which may be, for example, a cordless electric knife such as that disclosed in the copending application of Worthy L. Chambers, Ser. No. 574,648 filed Aug. 24, 1966, and assigned to the same assignee as the present application. The appliance 10 includes a suitable load, such as a battery-operated electric motor 11 connected across a pack of batteries or cells 12, here shown as four in number, and individually identified as 12a, 12b, 12c and 12d, through a suitable on-off switch 13. The batteries 12 are preferably of the nickel cadmium type so that they may be recharged through a useful number of cycles.

For recharging the batteries 12 there is provided a suitable charging circuit 16 which may conveniently be built into the stand or holder of the appliance 10, or which, if desired, may comprise a separate unit. The charging circuit is connectable to the appliance 10 for charging through a suitable pair of jacks 17 defining charging terminals 17a and 17b. The charging circuit 16 is of known construction and, as illustrated, includes a transformer generally designated as 18, including the conventional primary winding 18a and secondary winding 18b. The primary winding 18a of the transformer 18 is connected to a conventional power cord 19 with the conventional plug-in connector 20 at one end thereof. The secondary winding 18b of the transformer 18 has its end terminals connected to one terminal of each of the sections 21a and 21b of a full wave rectifier 21. The output of the full wave rectifier 21 is connected to one of the charging terminals 17b. The other of the charging terminals 17a is center tapped to the secondary winding 18b through a conventional center tap connector lead 22.

Figure 4:
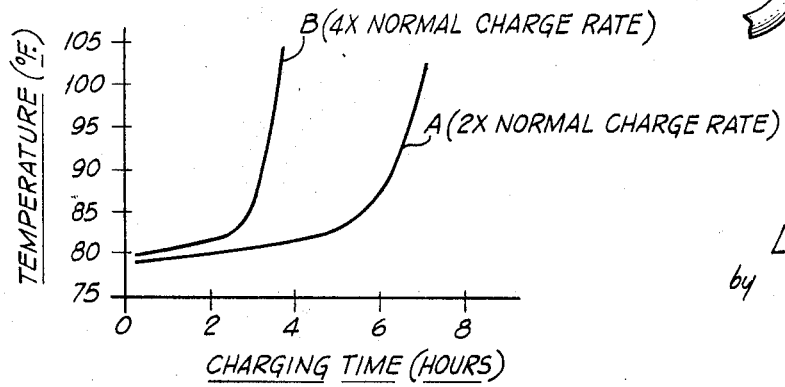
FIG. 4 is a graph showing the characteristic rapid rise in temperature of a nickel cadmium battery during a rapid charging operation.

In accordance with the present invention, it has been found that the temperature rise near the end of the charge of a nickel cadmium battery shows a very steep gradient. This is illustrated in FIG. 4 where the temperature is plotted against charging time. Curve A, for example, illustrates the temperature rise of the nickel cadmium battery charged at two times (C/5) the normal charging rate; Curve B illustrates the temperature of a nickel cadmium battery when charged at four times (C/2.5) the normal charging rate. During the major portion of the charging period the internal cell reaction is endothermic, thus balancing out thermal effects of current flow to the cell. As a matter of fact, at C/10 (normal rate) charge rates such cells actually decrease in temperature when charged from 10% capacity to about 70% capacity. After the nickel cadmium cell reaches about 70% capacity, more energy is being changed to heat than is being stored, and the cell temperature begins to rise rapidly. Since it has been found that cell capacity is reduced if nickel cadmium cells are charged at a temperature in excess of about 110° F. and since there is some time lag between the cell skin temperature and the internal temperature, particularly at high charge rates, it was found satisfactory to cycle the charging so as to cut off the charging when the cell skin temperature reached about 105° F.

Figure 2:
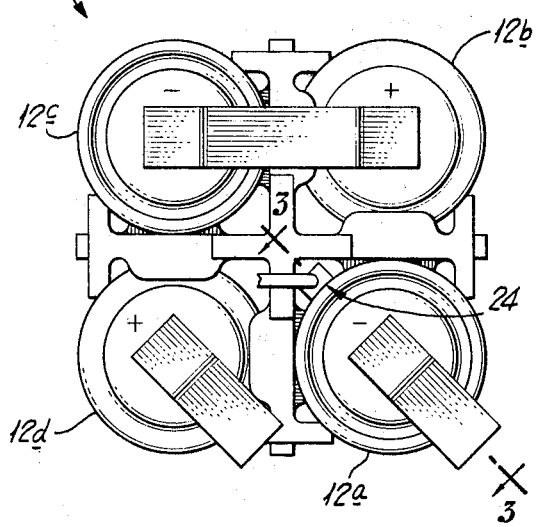
FIG. 2 is an end view of a battery pack having a thermostat associated with one of the battery cells in accordance with the present invention.

In order to limit the cell temperature to the desired maximum during the charging process, a thermostat 24 is mounted tightly against the longitudinal sides of one of the nickel cadmium cells specifically indicated as 12a. As the cells such as 12a commonly take an elongated cylindrical form, the thermostat may be conveniently mounted to the side of the casing. Moreover, as the battery cells 12a, 12b, 12c and 12d are commonly arranged in a compact pack, as illustrated in FIG. 2, it was found desirable to mount the thermostat 24 within the battery pack. The thermostat is set to open at the desired skin temperature, here set at 105° F.

Figure 3:
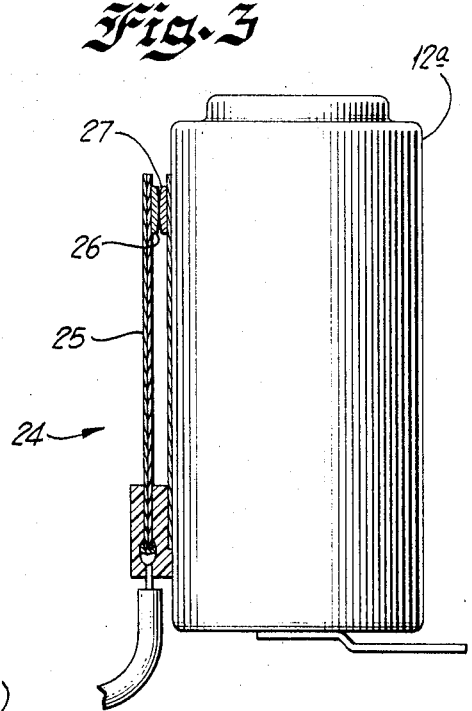
FIG. 3 is an elevational view of the particular cell in the battery pack of FIG. 2 which has the thermostat specifically associated therewith.

Referring now more particularly to the thermostat 24, it may be of known design including a bimetal strip 25, FIG. 3, adapted to separate a pair of contacts 26, 27 when the temperature of the battery skin 12a reaches 105°. One of the contacts 27 (stationary) is illustrated as supported by the casing of the battery 12a which forms one of the terminals of the battery, the other contact 26 (movable) being carried on the bimetal strip 25.

To provide for the cyclic charging of the battery pack, the switch 26–27 of thermostat 24 is serially connected with the batteries 12a, 12b, 12c and 12d across terminals 28a, 28b, adapted to electrically engage the terminals 17a, 17b during a charging operation.

From the above-detailed description, the operation of the charging circuit is believed clear. However, briefly, the battery pack 12 is quick-charged from the charging circuit 16 at a desired rapid rate, which may be, for example, four times the normal rate. Thus, in the commercial modified C cell, which has a capacity of 1200 milliampere hours, the normal recommended charge rate heretofore has been 120 milliamps or C/10 which must be placed on the cell for sixteen hours. It has been found that the nickel cadmium cells may be charged at a substantially higher rate, such as at 480 milliamps, provided that the temperature of the nickel cadmium cell is maintained below a desired maximum. Because of the characteristic upswing of the temperature rise as the nickel cadmium batteries approach a charged condition, it is possible to use the temperature of the cells to control the charging. Once the nickel cadmium batteries 12 have become charged, the average current during cycling of the thermostat has been found to be only slightly more than the recommended C/10 charging rate. For example, in a device built in accordance with the present invention it has been found that at a charge rate of 420 milliamps the switch contacts are closed 35.6% of the total cycle time, whereas at 750 milliamps the switch contacts are closed for 20.6% of the total cycle time. Accordingly, in operation the thermostat switch was found to turn on and off at a temperature difference of 3° F. Thus, the switch 26–27 of thermostat switch 24 is used to prevent excessive charging of the battery by thermostatically controlling the battery temperature so that it would not exceed 105° F. The charge cycle may be conducted for a long period of time but the actual cycling rate, once the nickel cadmium cells approach a full charge, is substantially reduced.

Moreover, it has been found that rapid charging of the nickel cadmium cells has no objectionably adverse effect on the life of the battery pack provided that the temperature of the cells is maintained below about 110° F. As a matter of fact, the required ampere hour input to the cells at a fast charge may be somewhat less than the ampere hour input required to regain full capacity when charged at the normal C/10 rate.

The switch 26–27 of thermostat 24 does not carry battery discharge currents to the motor 11. Thus, the thermostat switch 24 is prevented from cycling during very heavy loads or high rate discharges. Under such conditions it has been found that the battery temperature can reach 130° F. and if the switch of thermostat 24 were in series with the motor circuit, the motor operation would be interrupted even though the battery had some remaining capacity.

The rapid charging of the commercially available nickel cadmium batteries will provide for more rapid recycling of battery-operated household appliances such as electric knives, etc., so that their usefulness may be extended. The method according to the present invention is simple in operation and can be accomplished at very low cost. The battery life of nickel cadmium batteries has been found not to be adversely affected by the rapid charge. Thus, the quick-charging apparatus according to the present invention provides a desirable feature in many battery-operated appliances.

Although the present invention has been described by reference to only a single embodiment thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. Apparatus for quick-charging a nickel cadmium battery including temperautre sensing means fastened on the casing of said battery for sensing the casing temperature of said battery, switch means operatively connected to said temperature sensing means for cycling between an open and closed position in response to variations of sensed temperature by said temperature sensing means, terminal means for connection to a source of charging current and circuit means adapted to connect said switch means serially with said nickel cadmium battery across said terminal means.

2. In combination, an apparatus as set forth in claim 1 and including a plurality of elongated cylindrical nickel cadmium batteries, said temperature sensing means including a bimetal strip fastened in heat transfer relation generally longitudinally on the casing of one of said batteries.

3. The combination as set forth in claim 2 wherein said casing forms a part of said circuit means.

4. The combination as set forth in claim 3 wherein said plurality of batteries are arranged in a transverse pack, and said temperature sensing means is positioned toward the center of said pack.

5. A quick-rechargeable cordless type electric appliance comprising a plurality of nickel cadmium batteries arranged in a transverse pack, temperature sensing means for sensing the outside case temperature of one of said batteries and fastened in heat transfer relation generally longitudinally of one of said batteries toward the center of said pack, switch means operatively connected to said temperature sensing means for cycling between an open and closed position in response to variations of sensed temperature by said temperature sensing means, terminal means for connection to a source of charging current, circuit means connecting said switch means serially with said batteries across said terminal means, and load means adapted for connection serially across said batteries independently of said switch means.

References Cited

UNITED STATES PATENTS

| | | | |
|---|---|---|---|
| 1,758,522 | 5/1930 | Kershaw | 320—36 |
| 2,967,988 | 1/1961 | Seright | 320—36 |
| 418,701 | 1/1890 | Dey | 320—36 |
| 2,982,849 | 5/1961 | Volkerling et al. | 320—2 X |
| 3,028,536 | 4/1962 | Bilsky | 320—2 |
| 3,076,127 | 1/1963 | Grecu | 320—36 |
| 3,102,222 | 8/1963 | Harmer | 320—36 |

OTHER REFERENCES

Vinal: Storage Batteries, 4th ed., 1955, p. 245.

LEE T. HIX, Primary Examiner

J. M. GUNTHER, Assistant Examiner

U.S. Cl. X.R.

320—17, 36